United States Patent [19]
Adachi et al.

[11] Patent Number: 5,734,648
[45] Date of Patent: Mar. 31, 1998

[54] CDMA COMMUNICATIONS METHOD AND SYSTEM

[75] Inventors: Fumiyuki Adachi; Mamoru Sawahashi, both of Yokohama, Japan

[73] Assignee: NTT Mobile Communications Network, Inc., Japan

[21] Appl. No.: 541,620

[22] Filed: Oct. 10, 1995

Related U.S. Application Data

[62] Division of Ser. No. 335,089, Nov. 7, 1994, Pat. No. 5,586,113.

[30] Foreign Application Priority Data

| Nov. 8, 1993 | [JP] | Japan | 5-278523 |
| Mar. 25, 1994 | [JP] | Japan | 6-55585 |
| Oct. 25, 1994 | [JP] | Japan | 6-260601 |

[51] Int. Cl.$^6$ ........................... H04J 13/00
[52] U.S. Cl. ............ 370/342; 370/441; 375/205
[58] Field of Search ............ 370/18, 95.1, 95.2, 370/95.3, 84, 310, 312, 314, 317, 320, 321, 324, 326, 329, 332, 333, 335, 349, 342, 350, 441, 535, 536, 538, 543, 514, 515; 375/200, 201, 202, 203, 204, 205, 208, 273, 275, 279, 280, 284, 285, 283; 455/38.1, 3.2, 33.1, 33.2, 67.3; 380/20

[56] References Cited

U.S. PATENT DOCUMENTS

| 5,481,533 | 1/1996 | Honig et al. | 370/18 |
| 5,533,014 | 7/1996 | Williams et al. | 370/18 |

*Primary Examiner*—Dang Ton
*Attorney, Agent, or Firm*—John T. Johnson; Rogers & Wells

[57] ABSTRACT

A CDMA communications method capable of multiplex transmission of data over a wide range from a low rate to high rate, such as image data, without a considerable increase in a circuit scale. A fundamental transmission rate is determined, for example, at 32 kbps, a rate higher than 8 kbps conventionally used. The data whose transmission rate is equal to the fundamental transmission rate is transmitted in frames including no vacant portion. Data whose transmission rate is lower than the fundamental transmission rate (16 kbps, for example) are transmitted in frames including vacant portions. The vacant portions are not transmitted. This makes it possible to receive data through other channels during a time period associated with the vacant portions. Data of a higher transmission rate, 128 kbps, for example, can be multiplexed and transmitted through four channels using different spreading codes.

15 Claims, 9 Drawing Sheets

FUNDAMENTAL TRANSMISSION RATE $f_b$ bps $2f_b$ bps
(2-CHANNEL MULTIPLEXING)

$4f_b$ bps
(4-CHANNEL MULTIPLEXING)

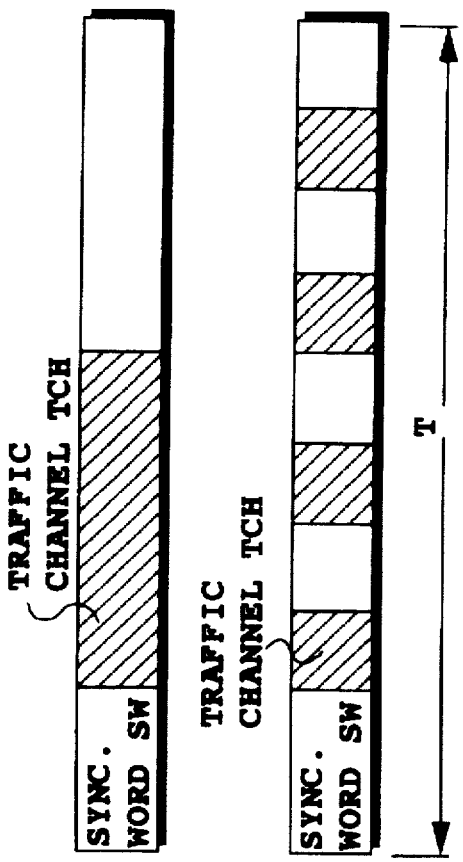
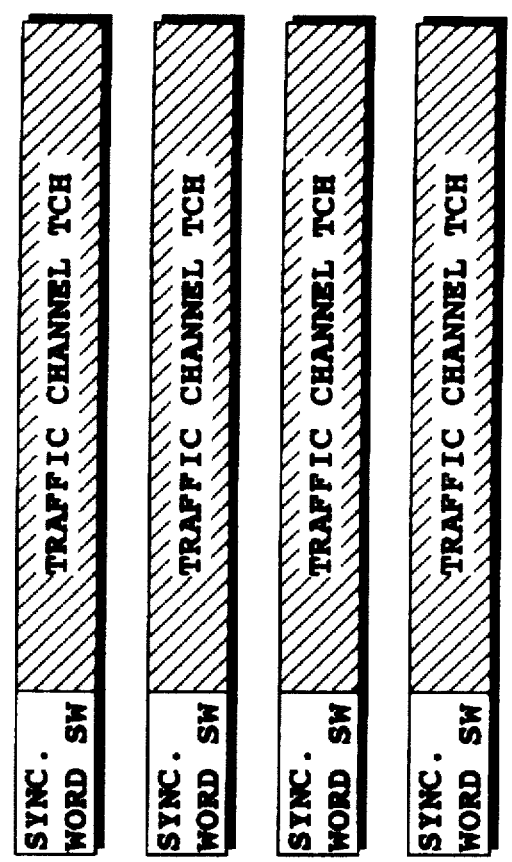
FIG.2A  FIG.2B  FIG.2C  FIG.2D

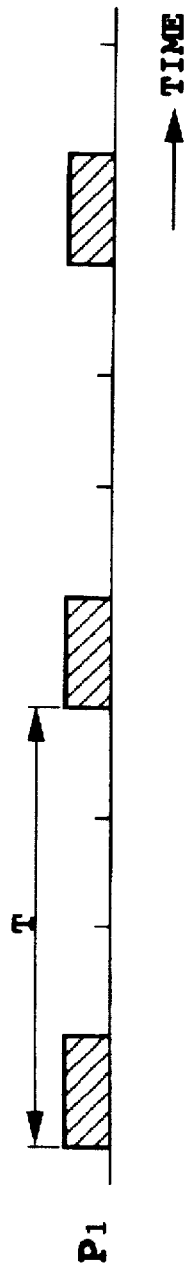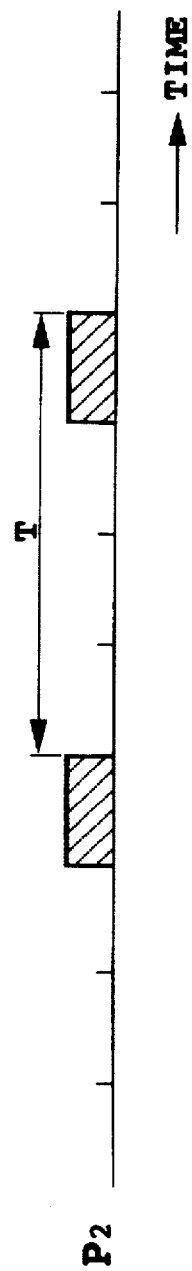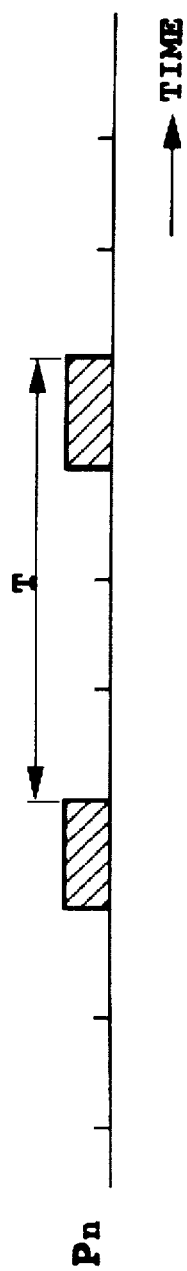

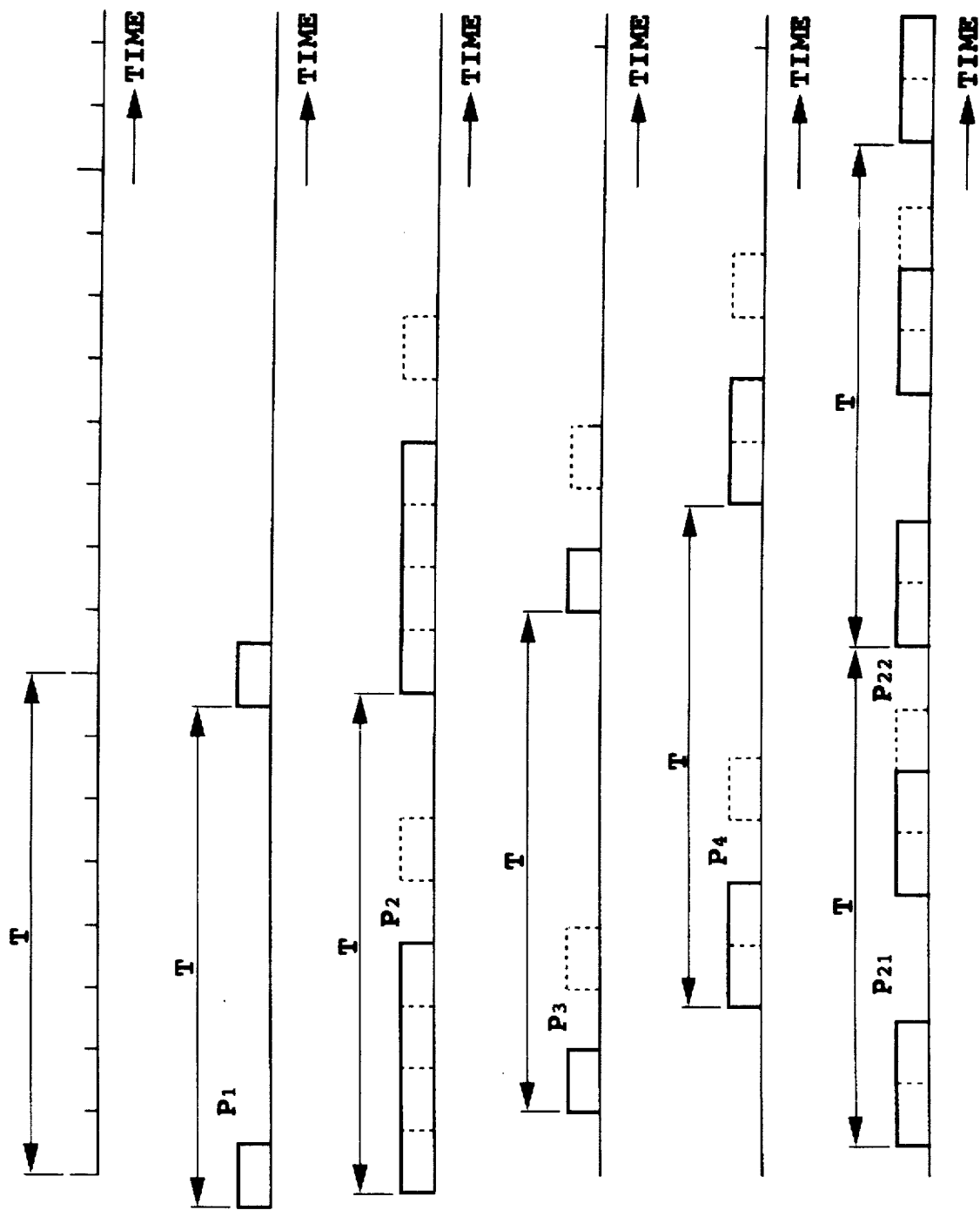

CDMA COMMUNICATIONS METHOD AND SYSTEM

This is a divisional of application Ser. No. 08/335,089, filed on Nov. 7, 1994 now U.S. Pat. No. 5,586,113.

BACKGROUND OF THE INVENTION

1. Field of the Invention

The present invention relates to a CDMA (Code Division Multiple Access) communications method and system preferably applied to mobile communications.

2. Description of Related Art

CDMA communication systems carry out a primary modulation of original data to be transmitted by QPSK or the like, and a secondary modulation of the primary modulation signal to enlarge the bandwidth by a spreading code such as a PN code (Pseudo-Noise code). The bit rate of the spreading code is called a chip rate, which is several tens to several hundreds times higher than the bit rate of the original data. Each user performs communications using the same frequency band, and is identified by a spreading code. Conventional CDMA systems arrange the original data into frames, perform the primary and secondary modulations of the frames, and transmit them. During communications, there are silent intervals, in which the modulations are stopped, and the transmission is interrupted. This prevents useless radio waves from being emitted, thereby suppressing interference power to other mobile stations. On the other hand, data whose transmission bit rate is less than that of voice coded data is transmitted by making vacant positions in a bit series in a frame, and stopping modulation of the vacant positions. The modulation is interrupted in either case. However, since the interruption is carried out in a random manner, the receiving side cannot utilize this vacant time for other purposes such as receiving broadcasting information transmitted from base stations.

Data rates of voice codecs for cellular systems are ranging from 8–16 kbps. Low rate data (e.g., 1.2–4.8 kbps) as well as facsimile data are also handled as important cellular services. Furthermore, it will become necessary in the near future to transmit signals of the ISDN (Integrated Service Digital Network) in addition to the low bit rate data transmission. Image codecs currently available generally employ transmission rates of 64 kbps or 384 kbps. To achieve flexible transmissions of low rate data to high rate image data, the multimedia transmission including images requires code division multiplexing in the CDMA systems.

FIGS. 1A–1C illustrate a code division multiplexing method when a high rate transmission is carried out in a conventional CDMA system. FIG. 1A shows a fundamental channel whose fundamental transmission rate is $f_b$ bps. A frame includes a synchronizing word SW, and a traffic channel TCH. FIGS. 1B and 1C illustrate the frame arrangements when the transmission rate is twice and four times as that of the fundamental transmission rate, respectively. When the transmission rate is twice, that is, $2f_b$ bps, two traffic channels are transmitted in parallel by using two different spreading codes (which is referred to as a two-channel parallel transmission) as shown in FIG. 1B, and when the transmission rate is four times, $4f_b$ bps, the data is transmitted by the four-channel parallel transmission as shown in FIG. 1C.

When the transmission rate of a coded voice signal is 8 kbps, for example, and this transmission rate is adopted as the fundamental transmission rate of a fundamental channel, an 8-channel code division multiplexing is required to transmit data at a transmission rate of 64 kbps. Moreover, a 256-channel code division multiplexing is required to transmit data at a transmission rate of 2 Mbps.

The conventional CDMA systems determine the transmission rate of the coded voice signal which is most frequently used as the fundamental transmission rate of the channel, and makes a frame corresponding to the fundamental transmission rate the fundamental frame. A high-speed transmission such as multimedia transmission is performed by parallel transmission of a plurality of fundamental channels at the transmitting side, and by discriminating the individual channels by correlators at the receiving side. This presents a problem in that the circuit scale of a transmitter and a receiver increases with the degree of multiplexing.

Furthermore, in the CDMA mobile communications, communication quality will be degraded as a mobile station moves apart from a base station during communications. Accordingly, to maintain a high quality communication state, it becomes necessary to search for a new base station close to the mobile station during the communication, and to connect the mobile station to the new base station.

However, since a user occupies the entire frame for the communication, and there is no vacant time in the frame time for searching for a new base station to be connected, it is impossible to detect the new base station to which the mobile station switches the communication. Therefore, the detection must be performed at the base station side rather than the mobile station side. More specifically, both the base station, which is communicating with the mobile station, and neighboring base stations receive the signal from the mobile station, measure the power of the received signal, and select the base station whose received signal has the maximum power as the new base station. This, however, presents a problem in that an amount of processing at the base station side increases with the increase in the number of the mobile stations. On the other hand, to perform this detection at the mobile station side, the mobile station must be provided with another secondary demodulation system (or decorrelator) for measuring the power of the control channels transmitted from neighboring base stations.

Each base station continuously or periodically transmits, through a common control channel, position information of the base station and spreading codes used by the neighboring base stations, as well as communication data to mobile stations. In addition, broadcasting data such as weather forecasts, stock prices, and paging data can also be transmitted. To receive these data (broadcasting data or paging data) during the communication, a conventional mobile station requires another demodulation system in addition to the demodulation system for the original communications.

Providing two demodulation systems in the mobile station presents a problem in that it will increase size, weight, and consuming power of the mobile station.

SUMMARY OF THE INVENTION

It is therefore an object of the present invention to provide a CDMA communications method and system which can implement variable rate data transmission from a high-rate to low-rate with a small amount of increase in circuitry of transceivers.

Another object of the present invention is to provide a CDMA communications method and system which can detect a base station, to which a mobile station is to be newly connected, at the mobile station side during the communication.

Still another object of the present invention is to provide a CDMA communications method and system wherein a mobile station can receive various channel data transmitted from base stations while the mobile station is communicating.

In a first aspect of the present invention, there is provided a CDMA (Code Division Multiple Access) communications method for transmitting transmission data through one or more channels between base stations and a mobile station, the method comprising the steps of:

generating a frame including at least a part of the transmission data and a vacant portion when a transmission rate of the transmission data is lower than a predetermined rate, the vacant portion having no data to be transmitted;

performing a primary modulation of the frame to produce a primary modulation signal;

performing a secondary modulation of the primary modulation signal using a spreading code to produce a secondary modulated wideband signal, the spreading code being different for each of the channels; and transmitting the wideband signal using a carrier.

Here, the step of generating a frame may comprise the steps of:

predetermining a transmission rate higher than a minimum transmission rate as a fundamental transmission rate; and determining a frame length such that the frame includes no vacant portion when data is transmitted at the fundamental transmission rate.

The minimum transmission rate may be a rate of transmitting a voice signal.

The CDMA communications method may further comprise the step of generating a plurality of frames to be assigned to a plurality of the channels when data is transmitted at a rate higher than the fundamental transmission rate.

The step of generating a frame may comprise the step of time-compressing the transmission data by a factor of N at every time period T (N is an integer greater than one, and T is the length of a frame at the fundamental transmission rate) when the transmission rate of the transmission data is 1/N of the fundamental transmission rate, thereby providing the frame with the vacant portion.

The CDMA communications method may further comprise the steps of:

obtaining the primary modulation signal by receiving a wideband signal associated with one of the channels, and by despreading the wideband signal using a spreading code; and restoring the transmission data by primarily demodulating the primary modulation signal obtained at the step of obtaining, and by time-expanding the demodulation output by a factor of N.

The CDMA communications method may further comprise the steps of:

measuring received power of a common control channel signal transmitted from a base station, other than a base station with which the mobile station is communicating, by switching the spreading code during a time period corresponding to the vacant portion in the frame; and deciding, during communications, a base station to which the communication is to be switched in accordance with the received power.

The CDMA communications method may further comprise the steps of:

receiving common control channel data transmitted from at least one of the base stations, during a time period corresponding to the vacant portion of the frame, by switching the spreading code; and demodulating the common control channel data.

The step of generating a frame may comprise the step of generating a frame from the transmission data by using a plurality of T/N long portions in the frame, the transmission data having a transmission rate equal to or less than (N−1)/N times of the fundamental transmission rate of the channel, where N is an integer equal to or greater than three.

In a second aspect of the present invention, there is provided a CDMA (Code Division Multiple Access) communications apparatus for transmitting transmission data through one or more channels between base stations and a mobile station, the apparatus comprising:

means for generating a frame including at least a part of the transmission data and a vacant portion when a transmission rate of the transmission data is lower than a predetermined rate, the vacant portion having no data to be transmitted;

means for performing a primary modulation of the frame to produce a primary modulation signal;

means for performing a secondary modulation of the primary modulation signal using a spreading code to produce secondary modulated wideband signal, the spreading code being different for each of the channels; and means for transmitting the wideband signal using a carrier.

The means for generating a frame may comprise:

means for predetermining a transmission rate higher than a minimum transmission rate as a fundamental transmission rate; and means for determining a frame length such that the frame includes no vacant portion when data is transmitted at the fundamental transmission rate.

The minimum transmission rate may be a rate of transmitting a voice signal.

The CDMA communications apparatus may further comprise means for generating a plurality of frames to be assigned to a plurality of the channels when data is transmitted at a rate higher than the fundamental transmission rate.

The means for generating a frame may comprise means for time-compressing the transmission data by a factor of N at every time period T (N is an integer greater than one, and T is the length of a frame at the fundamental transmission rate) when the transmission rate of the transmission data is 1/N of the fundamental transmission rate, thereby providing the frame with the vacant portion.

The CDMA communications apparatus may further comprise:

means for obtaining the primary modulation signal by receiving a wideband signal associated with one of the channels, and by despreading the wideband signal using a spreading code; and means for restoring the transmission data by primarily demodulating the primary modulation signal obtained by the means for obtaining, and by time-expanding the demodulation output by a factor of N.

The CDMA communications apparatus may further comprise:

means for measuring received power of a common control channel signal transmitted from a base station other than a base station with which the mobile station is communicating, by switching the spreading code during a time period corresponding to the vacant portion in the frame; and means for deciding during communications a base station to which the communication is to be switched in accordance with the received power.

The CDMA communications apparatus may further comprise:

means for receiving common control channel data transmitted from at least one of the base stations, during a time period corresponding to the vacant portion of the frame, by switching the spreading code; and means for demodulating the common control channel data.

The means for generating a frame may comprise means for generating a frame from the transmission data by using a plurality of T/N long portions in the frame, the transmission data having a transmission rate equal to or less than (N−1)/N times of the fundamental transmission rate of the channel, where N is an integer equal to or greater than three.

According to the present invention, since a transmission rate greater than the widely used voice transmission rate (8 kbps, for example) is selected as the fundamental transmission rate, the number of channels to be multiplexed is reduced, as compared with that of the conventional systems, when data of a higher transmission rate is transmitted. As a result, the circuit scale of a multiplexing circuit and that of a division circuit can be reduced. In addition, although a data transmission requires the entire channel even if its transmission rate is less than the fundamental transmission rate, the average transmission power is reduced because only part of the frame is used in this case, and hence, the interference power to other channels are reduced. As a result, capacity in terms of the number of subscribers of the system, in accordance with the present invention, is the same as that of the conventional CDMA system using a minimum transmission rate as the fundamental rate. In other words, the present invention, which adopts a rate higher than the minimum transmission rate as the fundamental rate, is not inferior to the conventional system in capacity in terms of the number of subscribers.

In addition, since a vacant portion is provided in each frame when a transmission rate is lower than the fundamental transmission rate, a mobile station can receive, during the communication, the common control data from other base stations by switching spreading codes in the vacant portion. Furthermore, comparing the received powers of common control channels transmitted from neighboring base stations makes it possible to determine the base station to which the mobile station is to be newly connected. In this case, since the two demodulation systems, which are required in the conventional mobile station, can be replaced with a single demodulation system, the increase in hardware is small.

The above and other objects, effects, features and advantages of the present invention will become more apparent from the following description of the embodiments thereof taken in conjunction with the accompanying drawings.

BRIEF DESCRIPTION OF THE DRAWINGS

FIGS. 2A–2D are schematic diagrams illustrating channel arrangements of a parallel transmission method, in accordance with the present invention, at various transmission rates;

FIGS. 6A–6C are schematic diagrams illustrating an example of forming traffic packets at the base station of FIG. 5;

FIGS. 9A–9F are schematic diagrams illustrating another example of forming traffic packets at the base station of FIG. 5.

DETAILED DESCRIPTION OF PREFERRED EMBODIMENTS

Figure 1A:
FIGS. 1A–1C are schematic diagrams illustrating channel arrangements of a conventional parallel transmission method at various transmission rates.
Figure 1B:
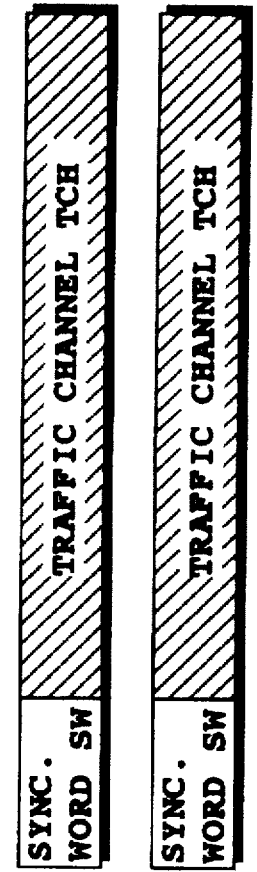
Figure 1C:
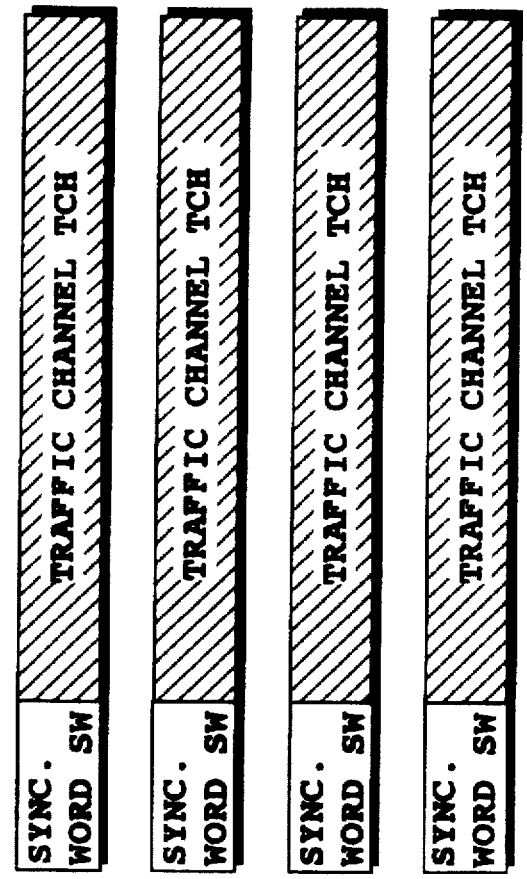

The invention will now be described with reference to the accompanying drawings.

FIGS. 2A–2D show the idea of the CDMA transmission method in accordance with the present invention. In the present invention, a fundamental transmission rate $f_b$ bps is determined such that it is a few times greater than a voice transmission rate, which has been conventionally used as the fundamental transmission rate. For example, a transmission rate of 32 kbps, which is four times greater than the conventional transmission rate of 8 kbps, is selected as the fundamental transmission rate. A frame of the fundamental transmission rate includes a synchronizing word SW, and a traffic channel TCH. A spectrum-spread wideband signal is generated by increasing the fundamental transmission rate by a factor of the processing gain (bandwidth spreading factor) through the primary and secondary modulations.

When the transmission rate of data is lower than the fundamental transmission rate $f_b$ bps, such as a low transmission rate coded voice, the original traffic channel TCH, in a frame of the fundamental transmission rate, is thinned out as shown in FIGS. 2B and 2C, where the length of a frame is indicated by T. FIGS. 2B and 2C illustrate cases when data are transmitted at a transmission rate ($f_b/2$) bps, or half the fundamental transmission rate $f_b$ bps. In FIG. 2B, the latter half of the traffic channel TCH is emptied, and in FIG. 2C, the traffic channel TCH is divided into eight portions, and portions at even positions are cleared. These portions in the frame, other than those used to transmit data, are called vacant portions, in which no data are transmitted. The vacant portions can be arranged in many other ways, as well.

In the CDMA method which transmits a signal after spreading it into a wideband signal by a PN (Pseudo-noise) code or a Gold code, the capacity, in terms of the number of subscribers per unit bandwidth, is determined by interference power, including noise power. In this embodiment, since data whose transmission rate is lower than the fundamental transmission rate are transmitted by thinning out the traffic channel TCH in a frame to make vacant portions, and a signal is not transmitted in the vacant portions, the interference on the other channels is reduced. For example, the interference power on the other channels, due to the transmission signal of FIGS. 2B and 2C, is reduced to half the power of a frame which is not thinned out. As a result, the capacity, in terms of the number of subscribers can be doubled. In other words, the number of subscribers is automatically increased at a low transmission rate as compared with the number of subscribers at the fundamental transmission rate. In this case, the fundamental transmission rate is twice the coded voice rate, and hence, the system of the present invention requires a double bandwidth of the conventional CDMA system. Accordingly, the capacity is the same as that of the conventional system. No disadvantage is seen.

On the other hand, when the transmission rate of data is higher than the fundamental transmission rate $f_b$ bps, such as $4f_b$ bps as shown in FIG. 2D, for example, a plurality of (four in this case) different spreading codes are used to carry out the parallel transmission of individual channels. In this case, since the fundamental transmission rate is set higher than the conventional one (four times higher in this case), the number of channels required is reduced from 16 channels to 4 channels. Since the number of channels of the parallel transmission is reduced, the scale of a modulation circuit at the transmission side, and that of a demodulation circuit at the receiving side, are reduced as compared with those of the conventional system.

Figure 3:
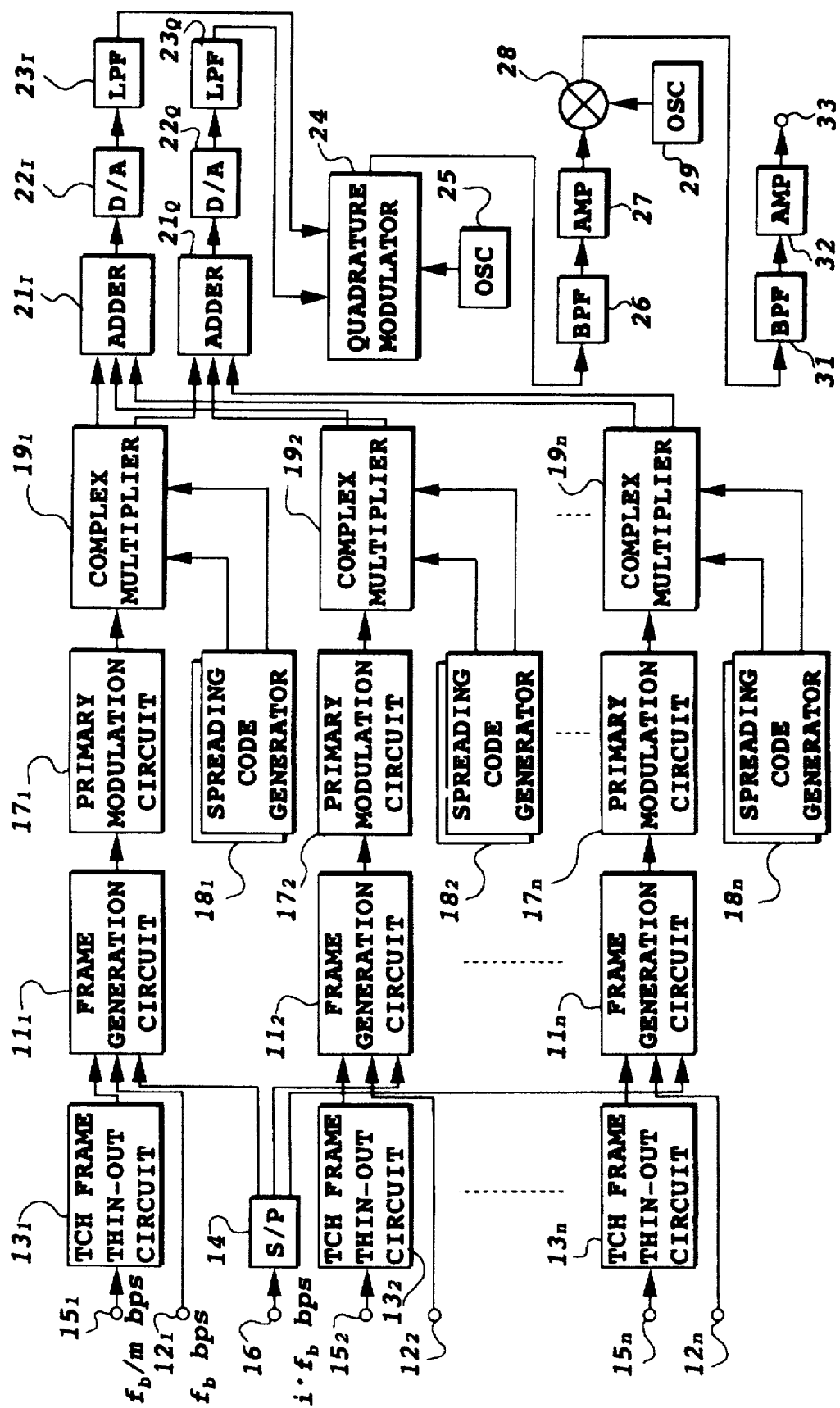
FIG. 3 is a block diagram showing an embodiment of a transmitter of a base station, to which the parallel transmission method, in accordance with the present invention, is applied.

FIG. 3 shows an embodiment of a transmitter of a base station for implementing the method in accordance with the present invention.

Each of n frame generation circuits $11_1-11_n$ (n is a positive integer) generates frames, each of which includes a synchronizing word and a traffic channel as shown in FIGS. 2A-2D, for each input data. The frame generation circuit $11_k$ (k=1-n) has three input terminals: an input terminal $12_k$, to which data of the fundamental transmission rate $f_b$ bps are inputted, an input terminal connected to the output terminal of a TCH (traffic channel) frame thin-out circuit $13_k$, and an input terminal connected to a k-th one of the n output terminals of a serial-to-parallel converter 14 which converts data, whose transmission rate is $if_b$ bps (i is an integer greater than one and equal to or less than n), into i parallel data.

Each TCH frame thin-out circuit $13_k$ has an input terminal $15_k$, to which data of an $f_b/m$ bps (m is an integer greater than 1) transmission rate are applied, and converts the input data into thinned-out TCH data, which are discretely inserted into the traffic channel TCH of a frame in a time division fashion as shown in FIGS. 2B and 2C. Data of an $if_b$ bps transmission rate are inputted to the serial-to-parallel converter 14 through an input terminal 16. The data supplied to the input terminals $12_1-12_n$, $15_1-15_n$, and 16 are controlled at the preceding stage, so that only one of the three input terminals of the frame generation circuit $11_1-11_n$ is provided with the input data.

The serial-to-parallel converter 14 receives data of an $if_b$ bps transmission rate, converts them into i sets of parallel data, each of which has the fundamental transmission rate $f_b$ bps, and distributes each set to each one of the frame generation circuits $11_1-11_i$.

The output of the frame generation circuit $11_k$ is supplied to a primary modulation circuit $17_k$, and is converted into two signals (in-phase signal I and quadrature signal Q) in accordance with the modulation method (QPSK, for example). The two signals produced from the primary modulation circuit $17_k$ are supplied to complex multiplier $19_k$, where the two signals are each multiplied by a spreading code supplied from a spreading code generator $18_k$, and are spectrum spread. The spreading code generators $18_1-18_n$ generate spreading codes different from each other. All the I signals which are spectrum spread and outputted from the complex multipliers $19_1-19_n$ are added by an adder $21_I$, and all the Q signals which are spectrum spread and outputted from the complex multipliers $19_1-19_n$ are added by an adder $21_Q$. The outputs of the adders $21_I$ and $21_Q$ are converted into analog signals by D/A converters $22_I$ and $22_Q$, respectively. After that, the analog signals, which are passed through low-pass filters $23_I$ and $23_Q$, are inputted to a quadrature modulator 24, which quadrature-modulates an intermediate frequency signal from an oscillator 25 by the input signals. The modulated signal is passed through a band-pass filter 26, amplified by an amplifier 27, inputted to a mixer 28, and frequency-mixed with a carrier signal from an oscillator 29. The output of the mixer 28 is passed through a bandpass filter 31, power-amplified by an amplifier 32, outputted to an output terminal 33, and is radiated from an unshown antenna as an electric wave.

Figure 4:
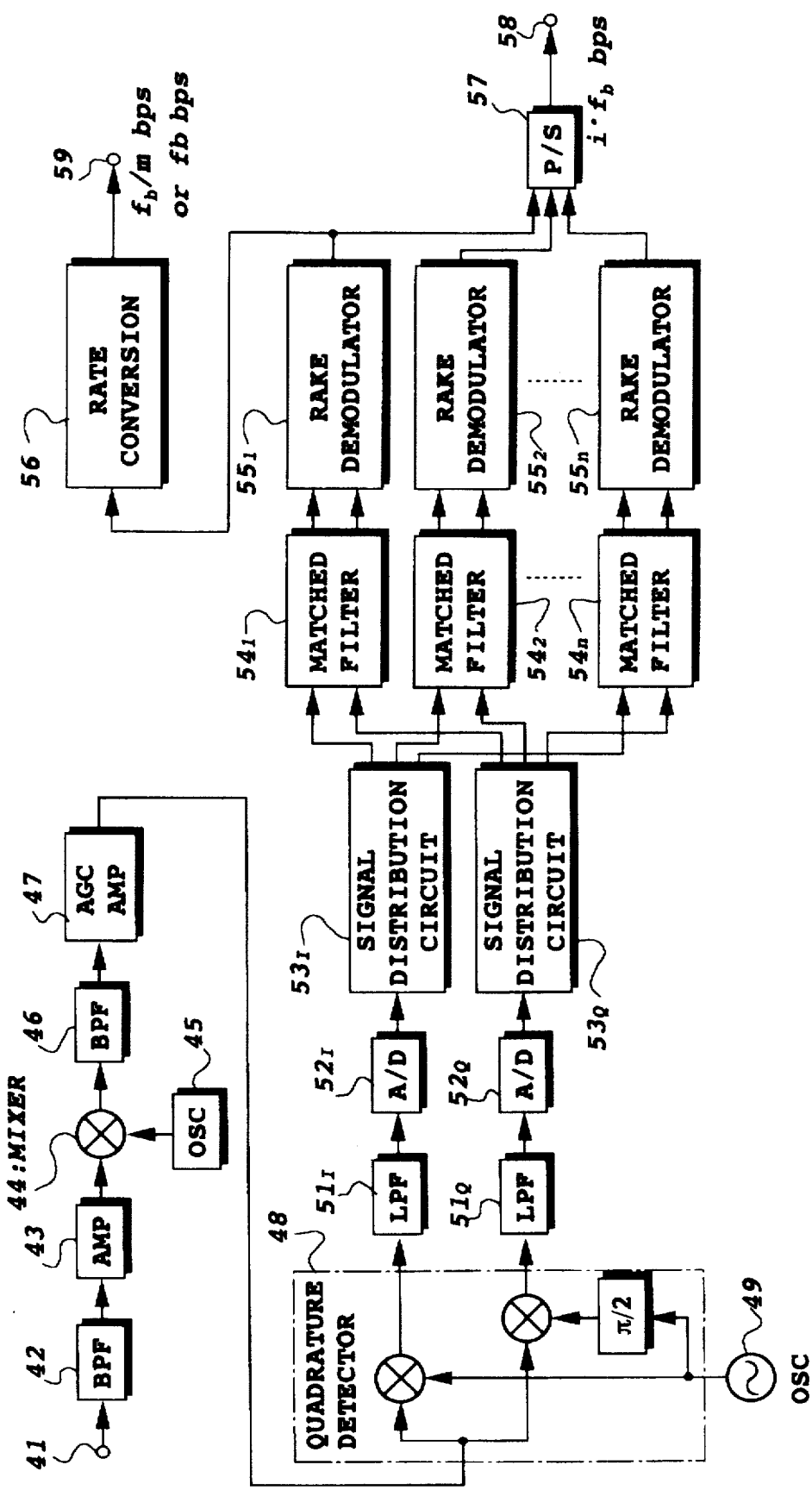
FIG. 4 is a block diagram showing an embodiment of a receiver, to which the parallel transmission method, in accordance with the present invention, is applied.

FIG. 4 shows an embodiment of a receiver receiving a signal transmitted from the transmitter of FIG. 3. The received signal at an input terminal 41 is passed through a bandpass filter 42, amplified by an amplifier 43, and is frequency-mixed with a signal from an oscillator 45 by a mixer 44. The mixed output is passed through a bandpass filter 46, so that the intermediate frequency component is passed. The intermediate frequency signal is amplified by an automatic gain control amplifier 47 to a signal whose level is substantially constant. The amplified output is converted into baseband I and Q signals by a quadrature detector 48 using a signal from an oscillator 49. The I and Q signals are passed through low-pass filters $51_I$ and $51_Q$, and inputted to A/D converters $52_I$ and $52_Q$, which convert them into digital signals, respectively. The outputs of the A/D converters $52_I$ and $52_Q$ are divided into n signals by a signal distribution circuit $53_I$ and $53_Q$, and are inputted to n matched filters $54_1-54_n$, respectively. The matched filters $54_1-54_n$ take correlations between the input signals and codes associated with n spreading codes at the transmitter side, and spectrum-despread the input signals. The respective matched filters separate multipath components having different time delays.

RAKE demodulators $55_1-55_n$, receiving the output of the matched filters $54_1-54_n$, weight and add the separated multipath components coherently, and demodulate the added result. The output of the RAKE demodulator $55_1$ is supplied to a rate conversion circuit 56 for data communications of the rate less than or equal to $f_b$ bps. The rate conversion circuit 56 outputs the data in continuous mode. Thus, when the transmission rate of the received signal is $f_b/m$ bps, where m is an integer equal to or greater than one, demodulated data is obtained at the output terminal 59. On the other hand, when the transmission rate of the received signal is $if_b$ bps, signals of the individual channels, each having a transmission rate of $f_b$ bps, are converted into a serial signal of $if_b$ bps by the parallel-to-serial converter 57, and the serial signal is outputted from an output terminal 58. A mobile receiver which provides data communications whose rate is less than or equal to $f_b$ bps requires only one set of demodulation circuits (a matched filter plus a RAKE demodulator), thereby making the circuit scale small.

There are two methods for thinning out the traffic channel TCH. A first method makes the transmitting timings of the frames random at each base station. A second method makes the arrangement of the data in a frame random, and assigns the random arrangements to respective users. The random arrangement can be prepared, for example, from the user number and random patterns. According to the first method, the base station transmits the information on TCH (traffic channel) rate to the mobile station so that a mobile station can properly pick up data in the traffic channel. According to the second method, it is sufficient for a base station to provide a mobile station with information on the arrangement pattern corresponding to the transmission rate.

Figure 5:
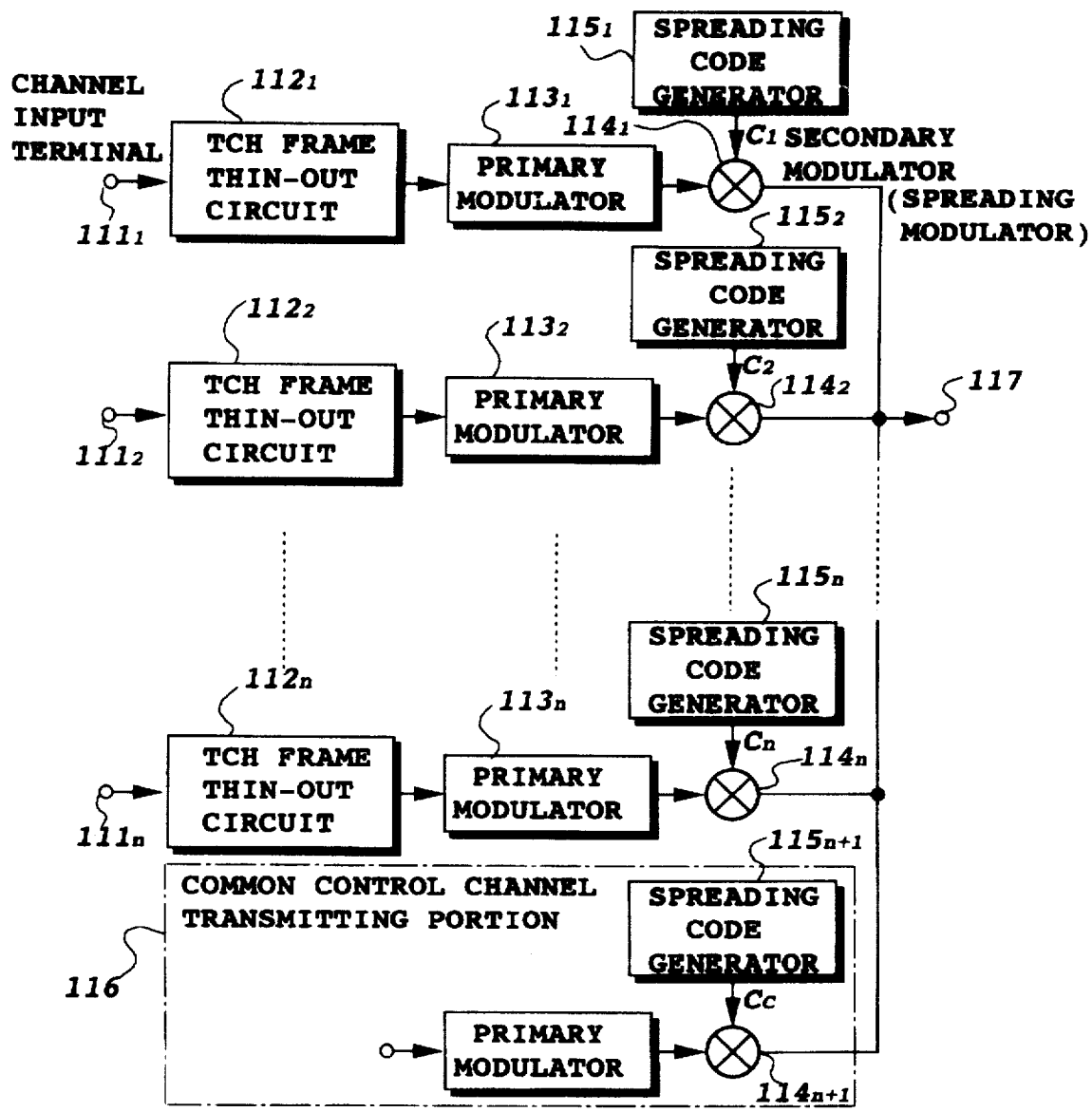
FIG. 5 is a block diagram showing a base station, to which the CDMA communications method, in accordance with the present invention, is applied.

FIG. 5 shows a major portion of a base station which employs the first method. In this embodiment, the transmission rate of data inputted to channel input terminals $111_1$–$111_n$ is 1/N of the fundamental transmission rate, where N is a positive integer. In other words, the data have a temporal length N times longer than the same amount of data of the fundamental transmission rate. The data are supplied to TCH frame thin-out circuits $112_1$–$112_n$, and are time-compressed by a factor of N (N=4 in FIGS. 6A–6C) at every time period T to form packets, where T is the length of a frame of the fundamental transmission rate. These packets undergo the primary modulation in primary modulators $113_1$–$113_n$, and then the spectrum-spreading modulation in secondary modulators (spreading modulators) $114_1$–$114_n$, thereby being converted into wideband signals. The spreading modulators $114_1$–$114_n$ receive different spreading codes $C_1$–$C_n$ from spreading code generators $115_1$–$115_n$.

In this case, the packets $P_1$–$P_n$ generated by the TCH frame thin-out circuits $112_1$–$112_n$ have random time relationships with each other, as shown in FIGS. 6A–6C. This is allowable because the plurality of packets are each associated with different spreading codes, and hence, the packets can be separated at the receiving side even if they overlap with each other temporally. Accordingly, as soon as individual channel signals are inputted, they can be formed into packets without any time adjustments.

Base stations have, in addition to the traffic channels, common control channels for transmitting control information such as identification information of respective base stations and paging information. Furthermore, a weather forecast, and other broadcasting information can be transmitted as required. The information on the common channel is spread by spreading code $C_c$, different from the spreading codes $C_1$–$C_n$, for communications, and is transmitted from common control channel transmitting portion 116. The outputs of the spreading modulators $114_1$–$114_{n+1}$ are combined, supplied to an output terminal 117, and transmitted from a transmitter not shown in FIG. 5 as an electric wave.

Figure 7:
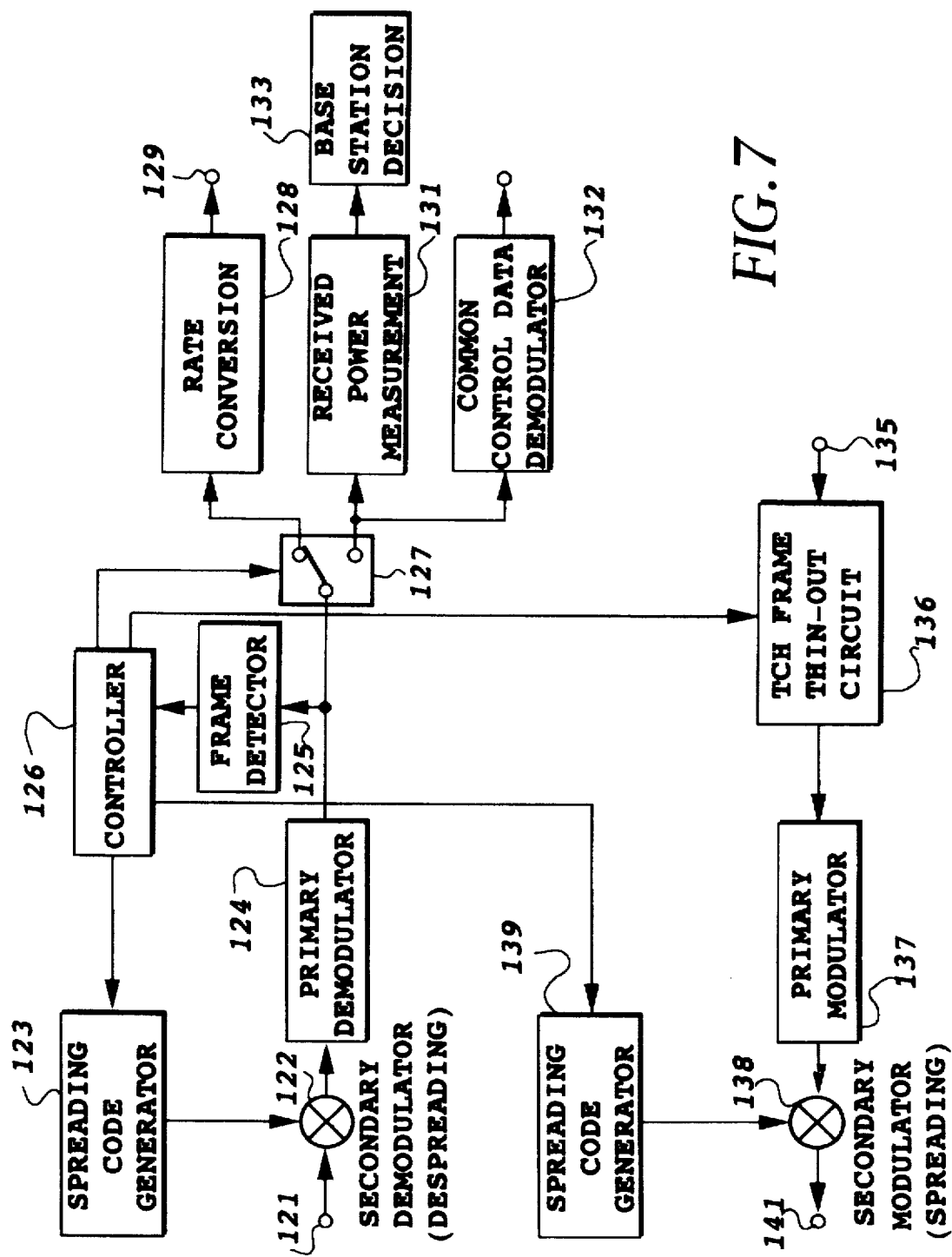
FIG. 7 is a block diagram showing a mobile station, to which the CDMA communications method in accordance with the present invention, is applied.
Figure 8A:
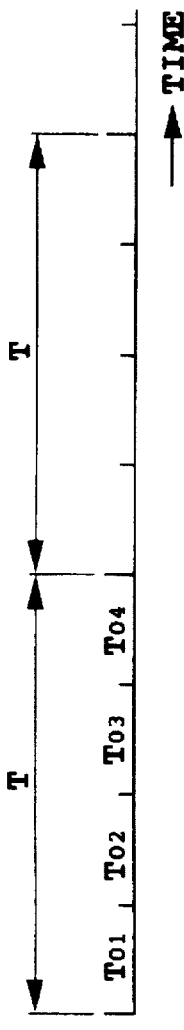
FIGS. 8A–8E are schematic diagrams illustrating receiving operation at the mobile station of FIG. 7.

FIG. 7 shows a major portion of a mobile station, to which the present invention is applied. Electric waves from base stations are received by a receiving portion not shown in FIG. 7, and are inputted to an input terminal 121 after being converted into an intermediate frequency signal. The intermediate frequency signal is despread by a spreading code assigned to the communication, for example, by the spreading code $C_2$. The despread output undergoes the primary demodulation by a primary demodulator 124. The demodulated output is inputted to a frame detector 125, which detects the period T and temporal positions of packets, and outputs frame pulses as shown in FIG. 8A. The frame pulses are supplied to a controller 126, which controls a switch 127 so that packets $P_2$, obtained by the despreading using the spreading code $C_2$, are supplied to a rate conversion circuit 128. The rate conversion circuit 128 expands the packets $P_2$ by a factor of N. Thus, the transmission data, which is inputted to the channel input terminal $111_2$, and whose transmission rate is 1/N of the fundamental transmission rate, is outputted from an output terminal 129.

Figure 8B:
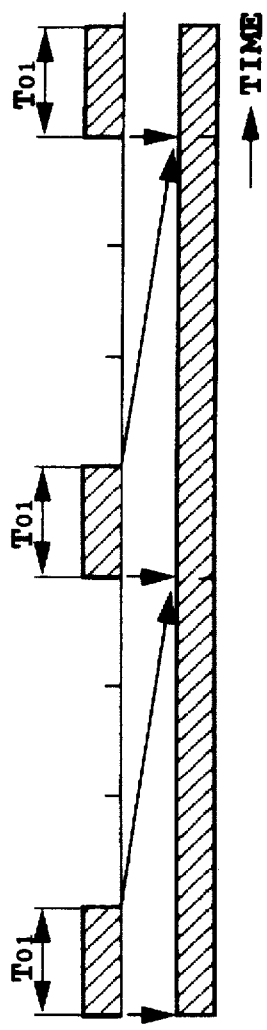
Figure 8C:
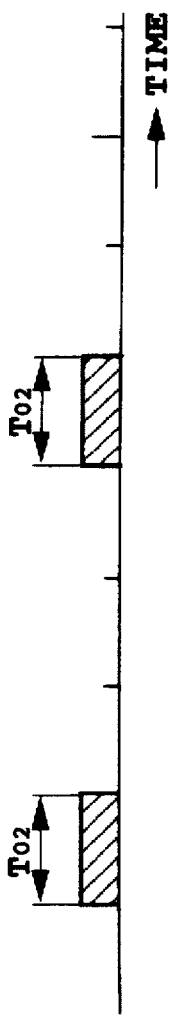
Figure 8D:
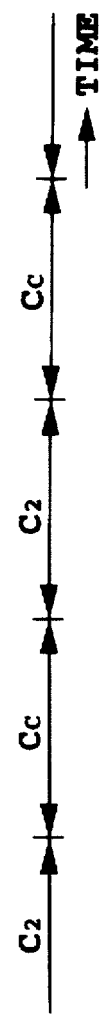
Figure 8E:
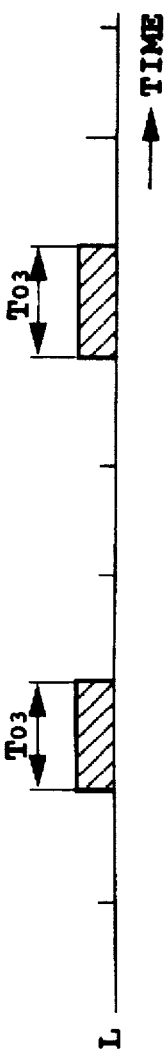

The controller 126 controls the spreading code generator 123, so that the spreading code ($C_c$, for example) associated with the common control channel of the current base station, or each of the neighboring base stations, is outputted from the spreading code generator 123, during a porkion (for example, portion $T_{O3}$ as shown in FIGS. 8D and 8E) other than the portion $T_{O1}$, which receives the packet $P_2$ in each frame as shown in FIG. 8B. In addition, the controller 126 changes the switch 127 so that the output terminal of the primary demodulator 124 is connected to a side of a received power measurement circuit 131 and a common control data demodulator 132. Accordingly, as shown in FIG. 8E, during the portion $T_{O3}$ in a frame, the common control channel from a base station is received, and the received power is measured by the received power measurement circuit 131. Thus, the received power measurement is carried out in the portion $T_{O3}$ of each frame by switching the spreading code to one of the spreading codes associated with the common control channels of the neighboring base stations. Then, the base station having the common control channel which is associated with the maximum received power, is selected as the base station to which the communication is to be switched, by a base station decision circuit 133 (which is usually included in the controller 126).

Changing the base station is required for continuous communication when measurement of the power of the received signal from the current base station is carried out in the portions $T_{O1}$, and the receiving quality degrades below an allowable level during the communication. In this case, the mobile station provides, through the traffic channel, the current base station with information on the base station to which the communication is to be switched, so that the switching to the new base station is performed. The channel switching operation of the traffic channel can be achieved in the same manner as a conventional method. The present invention differs from the conventional method in that the decision of the base station, to which the communication is to be switched, is made at the mobile station side, whereas the conventional method decides it at the base station side.

A common control data demodulator 132 can demodulate various broadcasting data or a paging during communication by supplying the despreading circuit 122 with the spreading code associated with the common control channel during a portion ($T_{O3}$, for example) other than the traffic packet receiving portion $T_{O1}$. Measuring of the received power and reception of the common control data can be carried out in the same frame. For example, two identical length vacant portions $T_{O3}$ and $T_{O4}$ other than the packet receiving portion $T_{O1}$ in a frame are selected, and one of them is used to measure the received power by providing the despreading circuit 122 with the spreading code associated with the common control channel from a neighboring base station.

The data to be transmitted from the mobile station have a transmission rate of 1/N of the fundamental transmission rate. A TCH frame thin-out circuit 136 of FIG. 7 receives the data through an input terminal 135, and temporally compresses the data by a factor of N every frame interval T to form packets as shown in FIG. 8C. The packets are assigned to a vacant portion (for example, $T_{O2}$) other than the receiving portions $T_{O1}$ and $T_{O3}$ by the controller 126. The packets undergo the primary modulation by a primary modulator 137. The primary modulation output is spectrum-spread modulated by a secondary modulator (spread modulator) 138 using a spreading code $C_{21}$ from a spreading code generator 139, and the spectrum-spread wideband signal is transmitted through a terminal 141, a transmitter not shown in FIG. 7, and an antenna for both transmitting and receiving. Since the transmit and receive portions are separated, the same radio carrier frequency can be used for transmitter and receiver. However, if different frequencies are used, transmitting and receiving can be performed at the same time (for example, at the portion $T_{01}$).

Since the data is transmitted after being time-compressed, data whose transmission rate is from 1/N to (N−1)/N of the funaamental transmission rate can be transmitted by using a single spreading code and by setting N equal to or greater than 3. One portion is used for receiving the broadcasting data and the remaining (N−1) portions can be used for communication.

FIGS. 9A–9F illustrate the relationships between frames and packets when the compression ratio N=8. FIG. 9B shows the case where data whose transmission rate is ⅛ of the fundamental transmission rate is inputted to the channel input terminal $111_1$ of the transmitter of FIG. 5. The data corresponding to a frame is time-compressed to a packet $P_1$ whose length is T/8, and is transmitted. FIG. 9C shows the case where data whose transmission rate is ½ of the fundamental transmission rate is inputted to the channel input terminal $111_2$ of the transmitter. The data corresponding to a frame is time-compressed to a packet $P_2$ whose length is T/2, and is transmitted. FIG. 9D shows the case where data whose transmission rate is ⅛ of the fundamental transmission rate is inputted to the channel input terminal $111_3$ of the transmitter. The data corresponding to a frame is time-compressed to a packet $P_3$ whose length is T/8, and is transmitted. FIG. 9E shows the case where data whose transmission rate is ¼ of the fundamental transmission rate is inputted to the channel input terminal $111_4$ of the transmitter. The data corresponding to a frame is time-compressed to a packet $P_4$ whose length is T/4, and is transmitted.

In this case, although the spreading codes $C_1$–$C_n$ inputted to the spreading modulators $114_1$–$114_n$ differ from each other, the same spreading code may be consistently used for data inputted to the same channel input terminal, or other spreading codes may be used. For example, the spreading code $C_2$ may be consistently used for the packet $P_2$ of FIG. 9C, or the spreading code may be changed for each one of the T/N long portions. In addition, the packet $P_2$ may be divided into two packets $P_{21}$ and $P_{22}$ as shown in FIG. 9F. By thus dividing the transmission data in a frame, an advantage of smoothing the interference is obtained.

The division of the transmission data in a frame can be carried out by the following procedure.

(1) Store the input data into a memory in the TCH frame thin-out circuit.

(2) Read data in the memory at the fundamental transmission rate in the designated time duration (=T/N) .

The packets shown in FIGS. 9B–9F are received by a mobile station, and restored to the original data by the rate conversion. Thus, even if the transmission rate of the input data is varied, the data can be transmitted as long as its transmission rate is equal to or less than the fundamental transmission rate. In addition, a mobile station can receive the common control data addressed to itself or to other mobile stations in a vacant portion in each frame by switching the spreading code for the despreading, at timings as indicated by broken lines in FIGS. 9C–9F, for example.

Although data whose transmission rate is lower than the fundamental transmission rate is transmitted through a single channel in this embodiment, the number of channels is not restricted to one. For example, although the packet $P_2$ in FIG. 9C is transmitted using four T/N long portions in the frame of a single channel, it can be transmitted by distributing the packet to four channels. In this case, each channel transmits the data using one portion in a frame.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A CDMA (Code Division Multiple Access) communications method for transmitting transmission data through one or more channels between base stations and mobile stations, said method comprising the steps of:

determining a transmission rate of the transmission data at one of rates ranging between a value higher than a predetermined rate and a value lower than said predetermined rate;

generating a frame including at least a part of said transmission data and a vacant portion when the transmission rate of said transmission data is lower than the predetermined rate, said vacant portion having no data to be transmitted;

performing a primary modulation of said frame to produce a primary modulation signal;

performing a secondary modulation of said primary modulation signal using a spreading code, to produce a secondary modulated wideband signal, said spreading code being different for each of said channels;

transmitting said wideband signal using a carrier.

2. The CDMA communications method as claimed in claim 1, wherein said step of determining a transmission rate comprises the step of:

setting the predetermined transmission rate at a rate higher than a minimum transmission rate as a fundamental transmission rate; and wherein said step of generating a frame comprises the step of:

determining a frame length such that the frame includes no vacant portion when data is transmitted at said predetermined fundamental transmission rate.

3. The CDMA communication method as claimed in claim 2, wherein said minimum transmission rate is a rate of transmitting a voice signal.

4. The CDMA communications method as claimed in claim 2, further comprising the step of generating a plurality of frames to be assigned to a plurality of said channels when data is transmitted at a rate higher than said predetermined fundamental transmission rate.

5. CDMA (Code Division Multiple Access) communications apparatus for transmitting transmission data through one or more channels between base stations and mobile stations, said apparatus comprising:

means for determining a transmission rate of the transmission data at a predetermined rate, said transmission rate of the transmission data being variable at different rates ranging between a value higher than said predetermined rate and a value lower than said predetermined rate;

means for generating a frame including at least a part of said transmission data and a vacant portion when the transmission rate of said transmission data is lower than the predetermined rate, said vacant portion having no data to be transmitted;

means for performing a primary modulation of said frame to produce a primary modulation signal;

means for performing a secondary modulation of said primary modulation signal using a spreading code, to produce a secondary modulated wideband signal, said spreading code being different for each of said channels; and means for transmitting said wideband signal using a carrier.

6. The CDMA communications apparatus as claimed in claim 5, wherein said means for determining a transmission rate comprises:

means for setting the predetermined transmission rate at a rate higher than a minimum transmission rate as a fundamental transmission rate; and wherein said means for generating a frame comprises:

means for determining a frame length such that the frame includes no vacant portion when data is transmitted at said predetermined fundamental transmission rate.

7. The CDMA communications apparatus as claimed in claim 6, wherein said minimum transmission rate is a rate of transmitting a voice signal.

8. The CDMA communications apparatus as claimed in claim 6, further comprising means for generating a plurality of frames to be assigned to a plurality of said channels when data is transmitted at a rate higher than said predetermined fundamental transmission rate.

9. In a CDMA (Code Division Multiple Access) communications system for transmitting transmission data through one or more channels between base stations and mobile stations, a transmitter comprising:

means for determining a transmission rate of the transmission data at a predetermined rate, said transmission rate of the transmission data being variable at different rates ranging between a value higher than said predetermined rate and a value lower than said predetermined rate;

means for generating a frame including at least a part of said transmission data and a vacant portion when a transmission rate of said transmission date is lower than the predetermined rate, said vacant portion having no data to be transmitted;

means for performing a primary modulation of said frame to produce a primary modulation signal;

means for performing a secondary modulation of said primary modulation signal using a spreading code, to produce a secondary modulated signal, said spreading code being different for each of said channels; and means for transmitting said wideband signal using a carrier.

10. In a CDMA (Code Division Multiple Access) communications system for transmitting transmission data through one or more channels between base stations and mobile stations, the transmission data being formed by a primary modulation of a frame to produce a primary modulation signal, and a secondary modulation of the primary modulation signal using a spreading code, to produce a secondary modulated wideband signal, wherein a transmission rate of said transmission data is variable at different rates ranging a value higher than a predetermined rate and a value lower than said predetermined rate and said transmission data has a vacant portion with no data to be transmitted when the transmission rate of said transmission data is lower than said predetermined rate, a receiver for receiving the transmission data, comprising:

means for obtaining said primary modulation signal by receiving a wideband signal associated with one of said channels, and by despreading said wideband signal using a spreading code; and means for restoring said transmission data by primarily demodulating said primary modulation signal obtained by said obtaining means, and by time-expanding a signal from said demodulating.

11. In a CDMA (Code Division Multiple Access) communications system for transmitting transmission data through one or more channels between base stations and mobile stations, said base stations each comprising:

means for determining a transmission rate of the transmission data at a predetermined rate, said transmission rate of the transmission data being variable at different rates ranging between a value higher than said predetermined rate and a value lower than said predetermined rate;

means for generating a frame including at least a part of said transmission data and a vacant portion when a transmission rate of said transmission data is lower than said predetermined rate, said vacant portion having no data to be transmitted;

means for performing a primary modulation of said frame to produce a primary modulation signal;

means for performing a secondary modulation of said primary modulation signal using a spreading code, to produce a secondary modulated wideband signal, said spreading code being different for each of said channels; and means for transmitting said wideband signal using a carrier.

12. In a CDMA (Code Division Multiple Access) communications system for transmitting transmission data through one or more channels between base stations and mobile stations, the transmission data being formed by a primary modulation of a frame to produce a primary modulation signal, and a secondary modulation of the primary modulation signal using a spreading code, to produce a secondary modulated wideband signal, wherein a transmission rate of said transmission data is variable at different rates ranging between a value higher than a predetermined rate and a value lower than the predetermined rate and said transmission data has a vacant portion with no data to be transmitted when the transmission rate of said transmission data is lower than the predetermined rate, said mobile stations each comprising:

means for obtaining said primary modulation signal by receiving a wideband signal associated with one of said channels, and by despreading said wideband signal using a spreading code; and means for restoring said transmission data by primarily demodulating said primary modulation signal obtained by said obtaining means, and by time-expanding a signal from said demodulating.

13. A CDMA (Code Division Multiple Access) communications system for transmitting transmission data through one or more channels between base stations and mobile stations, said system comprising:

means for determining a fundamental transmission rate of the transmission data at a predetermined rate lower than a minimum transmission rate, means for selecting said transmission rate of the transmission data within a range between a value higher than said predetermined fundamental transmission rate and a value lower than said predetermined fundamental transmission rate;

a first frame generator for generating a frame without a vacant portion, said vacant portion having no data to be transmitted, when the transmission rate of said transmission data is at the predetermined fundamental transmission rate;

a second frame generator for generating a frame including at least a part of said transmission data and a vacant portion with no data to be transmitted, when the transmission rate of said transmission data is lower than the predetermined fundamental transmission rate, said vacant portion having no data to be transmitted;

a third frame generator for generating a plurality of frames including the transmission data, when the transmission rate of said transmission data is higher than the predetermined fundamental transmission rate, a thin-out circuit connected to the second frame generator for thinning out the frame to form the vacant portion, when the transmission rate of said transmission data is lower than the predetermined fundamental transmission rate, and a multiple modulator for modulating the frames using a spreading code, to produce a modulated wideband signal, said spreading code being different for each of said channels, when the transmission rate of said transmission data is higher than the predetermined fundamental transmission rate.

14. The CDMA (Code Division Multiple Access) communications system as claimed in claim 13 further comprising:

means for measuring received power of a common control channel signal transmitted from a base station other than a base station with which the mobile station is communicating, by switching said spreading code during a time period corresponding to said vacant portion in said frame.

15. The CDMA (Code Division Multiple Access) communications system as claimed in claim 13 further comprising:

means for receiving common control channel data transmitted from at least one of said base stations during a time period corresponding to said vacant portion of said frame by switching said spreading code.

* * * * *